United States Patent
Hernandez Herranz et al.

(10) Patent No.: US 11,580,452 B2
(45) Date of Patent: Feb. 14, 2023

(54) SELECTING LEARNING MODEL

(71) Applicant: Telefonaktiebolaget LM Ericsson (publ), Stockholm (SE)

(72) Inventors: Aitor Hernandez Herranz, Stockholm (SE); Lars Andersson, Solna (SE); José Araújo, Stockholm (SE); Soma Tayamon, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 278 days.

(21) Appl. No.: 16/768,665

(22) PCT Filed: Dec. 1, 2017

(86) PCT No.: PCT/EP2017/081208
§ 371 (c)(1),
(2) Date: May 30, 2020

(87) PCT Pub. No.: WO2019/105572
PCT Pub. Date: Jun. 6, 2019

(65) Prior Publication Data
US 2021/0174249 A1    Jun. 10, 2021

(51) Int. Cl.
*G06N 20/00* (2019.01)
*G06K 9/62* (2022.01)
*G06N 3/04* (2006.01)

(52) U.S. Cl.
CPC ........... *G06N 20/00* (2019.01); *G06K 9/6267* (2013.01); *G06N 3/0454* (2013.01)

(58) Field of Classification Search
USPC ......................................................... 706/12
See application file for complete search history.

(56) References Cited

U.S. PATENT DOCUMENTS

2014/0324745 A1* 10/2014 Leppanen ............ G06K 9/6254
                                                                    706/12
2015/0324688 A1    11/2015 Wierzynski et al.
2016/0275413 A1     9/2016 Shi et al.

FOREIGN PATENT DOCUMENTS

CN        107393525 A     11/2017
WO    WO 2013/093173 A1   4/2013

OTHER PUBLICATIONS

International Search Report and Written Opinion of the International Searching Authority, PCT/EP2017/081208, dated Sep. 11, 2018, 15 pages.

(Continued)

*Primary Examiner* — Harry S Hong
(74) *Attorney, Agent, or Firm* — Sage Patent Group

(57) ABSTRACT

According to a first aspect, it is presented a method for dynamically selecting a learning model for a sensor device. The learning model is configured for determining output data based on sensor. The method comprises the steps of: detecting a need for a new learning model for the sensor device based on performance of a currently loaded learning model in the sensor device; determining at least one feature candidate based on sensor data from the at least one sensor, wherein each one of the at least one feature candidate is associated with a different source of sensor data; selecting a new learning model, from a set of candidate learning models, based on the at least one feature candidate and input features of each one of the candidate learning models; and triggering the new learning model to be loaded on the sensor device, replacing the currently loaded learning model.

20 Claims, 6 Drawing Sheets

(56) References Cited

OTHER PUBLICATIONS

Gomes, J. B., et al., "Mining Recurring Concepts in a Dynamic Feature Space," IEEE Transactions on Neural Networks and Learning Systems (XP011533858), vol. 25, No. 1, Jan. 2014, 16 pages.
"NeuroMem Technology Reference Guide," (XP055499430) General Vision, Version 4.0.1, Revised May 6, 2016, <URL: http://web.archive.org/web/20160813044327if_http://general-vision.com/documentatian/TM_NeuroMem_Technology_Reference_Guide.pdf> 27 pages.
Katakis, I., et al., "Tracking Recurring Contexts Using Ensemble Classifiers: An Application To Email Filtering," (XP019784649) Knowl Inf Syst (2010) 22:371-391, DOI 10.1007/s10115-009-0206-2, Apr. 24, 2009, Springer-Verlag London Limited 2009, 21 pages.
"NeuroMem Application Deployment: Learning and Inference as a Single Entity," General Vision, Sep. 23, 2019, 19 pages.
"Intel Quark SE Microcontroller C1000, Platform Design Guide," Intel, Jun. 2017, Document No. 334715-004EN, 65 pages.

* cited by examiner

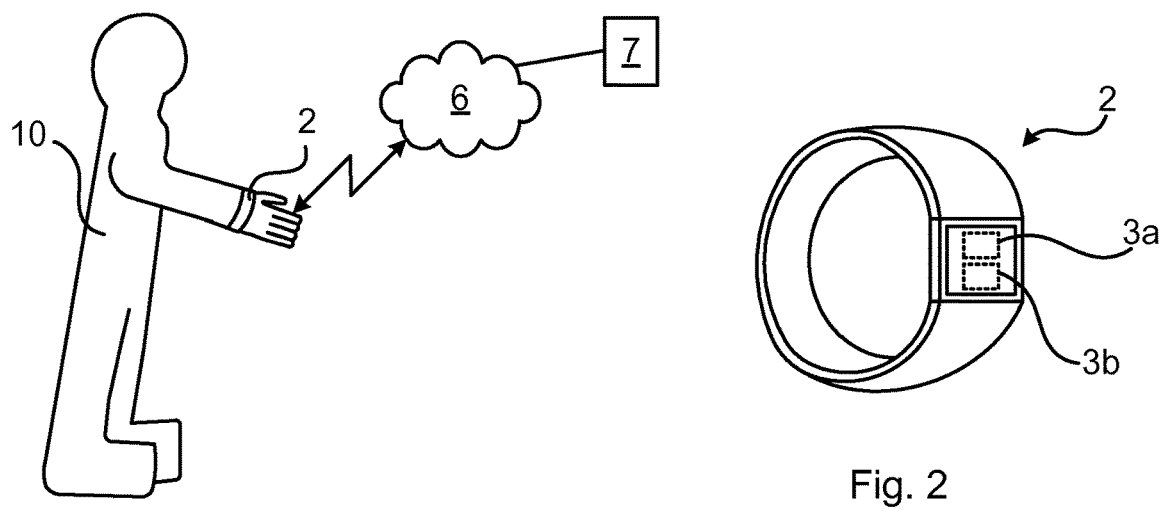
Fig. 1
Fig. 2
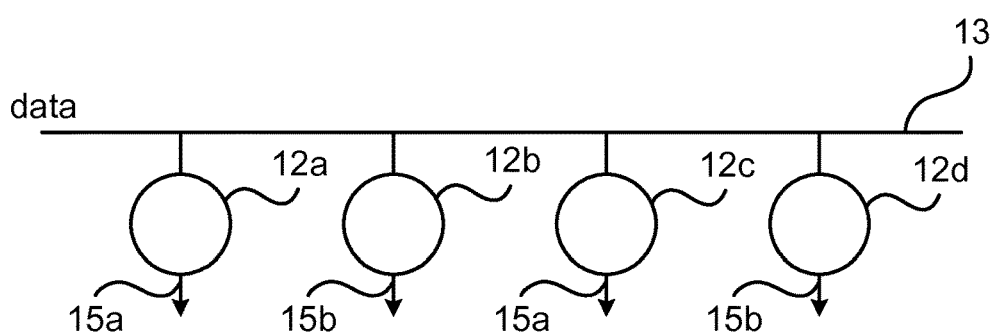
Fig. 3A
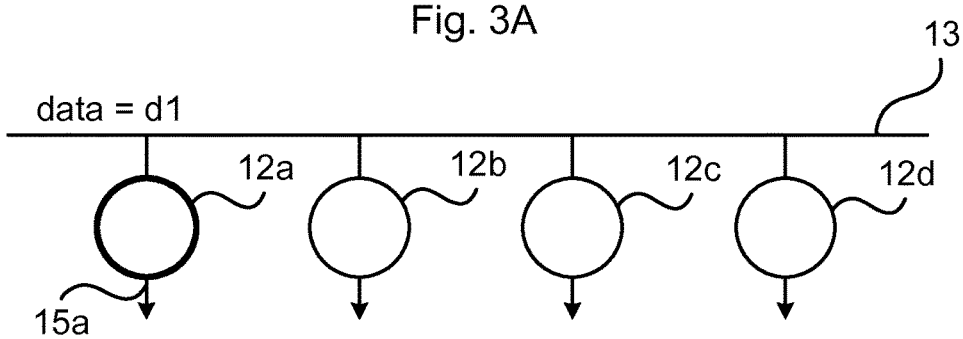
Fig. 3B
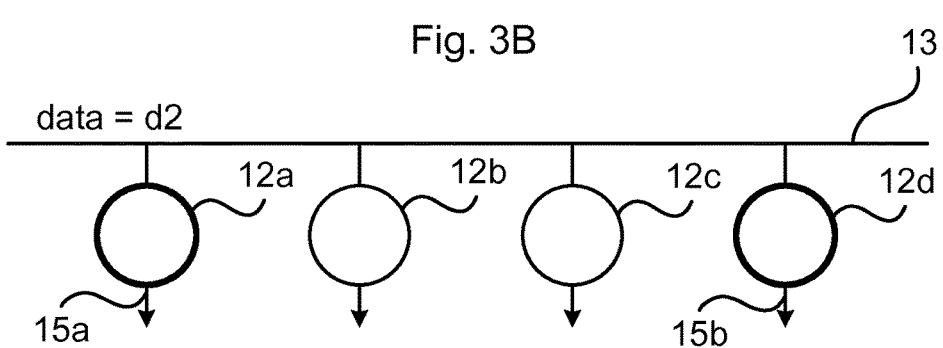
Fig. 3C

SELECTING LEARNING MODEL

CROSS REFERENCE TO RELATED APPLICATIONS

This application is a 35 U.S.C. § 371 national stage application of PCT International Application No. PCT/EP2017/081208 filed on Dec. 1, 2017, the disclosure and content of which is incorporated by reference herein in its entirety.

TECHNICAL FIELD

The invention relates to a method, model determiners, a computer program and a computer program product for dynamically selecting a learning model for a sensor device.

BACKGROUND

Wearable electronic devices, commonly known simply as wearables, have gained increased popularity recently. Now, with the push for the Internet of Things (IoT), the usage of wearables will continue to grow. Starting from sport watches or heart rate straps which have been used for a long time; continuing with trendy fitness wristbands and smartwatches; leading to some close-future wearables such as blood analysers, body pressure sensors, skin damage detectors, and brain reading devices.

A strong previous trend was to move the computation to a centralised location (also known as cloud computing) to reduce the computational requirements and power usage in distributed low-power devices and increase computational speed by the use of more powerful computers.

Looking into the future with tens of billions of devices, of which a large portion are IoT devices and wearables, it is easy to justify the new trend to move from the centralised computation power and storage, to a distributed computing scenario. Terms like edge cloud, fog cloud, edge computing, edge analytics all refer to a concept where processing moves closer to the device.

Machine learning, ML, is becoming a key technology in the distributed processing. Machine learning can e.g. be used for pattern recognition of data from sensor devices with multiple sensors, such as wearables. The sensors of such sensor devices can be used in different ways. For instance, accelerometers of a wearable can be used both for activity tracking (running, cycling, etc.) as well as for a user interface. Each use of the wearable requires a separate ML model. However, the sensor devices are often extremely constrained and in general it is often not possible to simultaneously perform pattern recognition according to several different ML models, due to constraints in e.g. memory, processing and/or power requirements.

SUMMARY

It is an object of embodiments herein to provide a way to efficiently switch between different learning models in a sensor device.

According to a first aspect, it is presented a method for dynamically selecting a learning model for a sensor device comprising at least one sensor, the learning model being configured for determining output data based on sensor data from the at least one sensor. The method is performed in a model determiner and comprising the steps of: detecting a need for a new learning model for the sensor device based on performance of a currently loaded learning model in the sensor device; determining at least one feature candidate based on sensor data from the at least one sensor, wherein each one of the at least one feature candidate is associated with a different source of sensor data; selecting a new learning model, from a set of candidate learning models, based on the at least one feature candidate and input features of each one of the candidate learning models; and triggering the new learning model to be loaded on the sensor device, replacing the currently loaded learning model.

The method may further comprise the step of: determining a number of correct classifications and number of misclassifications, during a time period, of the currently loaded learning model. In such a case, in the step of detecting a need for a new learning model, the performance is based on the number of correct classifications and the number of misclassifications.

The step of determining may further comprise determining a number of no classifications, during the time period, of the currently loaded learning model. In such a case, in the step of detecting a need for a new learning model, the performance is based on the number of no classifications.

In the determining at least one feature candidate step, the sensor data may be normalised over time for each sensor prior to determining the at least one feature candidate.

The step of selecting a new learning model may comprise selecting the candidate learning model, from the set of candidate learning models, that has the greatest number of overlapping features with the at least one feature candidate.

The step of selecting a new learning model may comprise the steps of: obtaining a candidate feature weight for each feature candidate; finding, for each candidate learning model, a set of overlapping features consisting of any feature candidates overlapping the input features; adding up, for each candidate learning model, the candidate feature weights of the candidate features forming part of the set of overlapping features, yielding a weighted candidate feature score; and selecting the new learning model to be the candidate learning model having the greatest weighted candidate feature score.

The step of selecting a new learning model may comprise the steps of: obtaining, for each candidate learning model, an input feature weight for each input feature; finding, for each candidate learning model, a set of overlapping features being input features overlapping the at least one feature candidate; adding up, for each candidate learning model, the input feature weights for the input features of the overlapping features, yielding a weighted input feature score; and selecting the new learning model to be the candidate learning model having the greatest weighted input feature score.

The method may further comprise the step of: storing the input feature weights associated with respective input features as a set of input feature weights. In such a case, for at least one subsequent iteration of the method, the step of determining at least one feature candidate is omitted, the step of obtaining an input feature weight is omitted, and the step of finding a set of overlapping features is omitted, and wherein the step of adding up is based on the stored set of input feature weights.

The step of detecting a need for a new learning model for the sensor device may also be based on user input.

The learning model may be a machine learning, ML, model.

According to a second aspect, it is presented a model determiner for dynamically selecting a learning model for a sensor device comprising at least one sensor, the learning model being configured for determining output data based on sensor data from the at least one sensor. The model determiner comprises: a processor; and a memory storing instructions that, when executed by the processor, cause the model determiner to: detect a need for a new learning model for the sensor device based on performance of a currently loaded learning model in the sensor device; determine at least one feature candidate based on sensor data from the at least one sensor, wherein each one of the at least one feature candidate is associated with a different source of sensor data; select a new learning model, from a set of candidate learning models, based on the at least one feature candidate and input features of each one of the candidate learning models; and trigger the new learning model to be loaded on the sensor device, replacing the currently loaded learning model.

The model determiner may further comprise instructions that, when executed by the processor, cause the model determiner to: determine a number of correct classifications and number of misclassifications, during a time period, of the currently loaded learning model. In such a case, the instructions to detect a need for a new learning model comprise instructions that, when executed by the processor, cause the model determiner to obtain the performance based on the number of correct classifications and the number of misclassifications.

The instructions to determine may further comprise instructions that, when executed by the processor, cause the model determiner to determine a number of no classifications, during the time period, of the currently loaded learning model. In such a case, the instructions to detect a need for a new learning model comprise instructions that, when executed by the processor, cause the model determiner to obtain the performance based on the number of no classifications.

The instructions to determine at least one feature candidate may comprise instructions that, when executed by the processor, cause the model determiner to normalise the sensor data over time for each sensor prior to determining the at least one feature candidate.

The instructions to select a new learning model may comprise instructions that, when executed by the processor, cause the model determiner to select the candidate learning model, from the set of candidate learning models, that has the greatest number of overlapping features with the at least one feature candidate.

The instructions to select a new learning model may comprise instructions that, when executed by the processor, cause the model determiner to: obtain a candidate feature weight for each feature candidate; find, for each candidate learning model, a set of overlapping features consisting of any feature candidates overlapping the input features; add up, for each candidate learning model, the candidate feature weights of the candidate features forming part of the set of overlapping features, yielding a weighted candidate feature score; and select the new learning model to be the candidate learning model having the greatest weighted candidate feature score.

The instructions to select a new learning model may comprise instructions that, when executed by the processor, cause the model determiner to: obtain, for each candidate learning model, an input feature weight for each input feature; find, for each candidate learning model, a set of overlapping features being input features overlapping the at least one feature candidate; add up, for each candidate learning model, the input feature weights for the input features of the overlapping features, yielding a weighted input feature score; and select the new learning model to be the candidate learning model having the greatest weighted input feature score.

The model determiner may further comprise instructions that, when executed by the processor, cause the model determiner to: store the input feature weights associated with respective input features as a set of input feature weights. In such a case, for at least one subsequent iteration of the instructions, the instructions to determine at least one feature candidate are omitted, the instructions to obtain an input feature weight are omitted, and the instructions to find a set of overlapping features are omitted, and wherein the instructions to add up is based on the stored set of input feature weights.

The instructions to detect a need for a new learning model for the sensor device may also be based on user input.

The learning model may be a machine learning, ML, model.

According to a third aspect, it is presented a model determiner comprising: means for detecting a need for a new learning model, for a sensor device comprising at least one sensor, based on performance of a currently loaded learning model in the sensor device, each learning model being configured for determining output data based on sensor data from the at least one sensor; means for determining at least one feature candidate based on sensor data from the at least one sensor, wherein each one of the at least one feature candidate is associated with a different source of sensor data: means for selecting a new learning model, from a set of candidate learning models, based on the at least one feature candidate and input features of each one of the candidate learning models; and means for triggering the new learning model to be loaded on the sensor device, replacing the currently loaded learning model.

According to a fourth aspect, it is presented a computer program for dynamically selecting a learning model for a sensor device comprising at least one sensor, the learning model being configured for determining output data based on sensor data from the at least one sensor. The computer program comprising computer program code which, when run on a model determiner causes the model determiner to: detect a need for a new learning model for the sensor device based on performance of a currently loaded learning model in the sensor device; determine at least one feature candidate based on sensor data from the at least one sensor, wherein each one of the at least one feature candidate is associated with a different source of sensor data; select a new learning model, from a set of candidate learning models, based on the at least one feature candidate and input features of each one of the candidate learning models; and trigger the new learning model to be loaded on the sensor device, replacing the currently loaded learning model.

According to a fifth aspect, it is presented a computer program product comprising a computer program according to the fourth aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIG. 1 is a schematic diagram illustrating an environment in which embodiments presented herein can be applied;

FIG. 2 is a schematic diagram illustrating an embodiment of a sensor device of FIG. 1;

FIGS. 3A-C are schematic diagrams illustrating the use of a machine learning model which can be applied in the embodiment of FIG. 1;

DETAILED DESCRIPTION

Figure 4A:
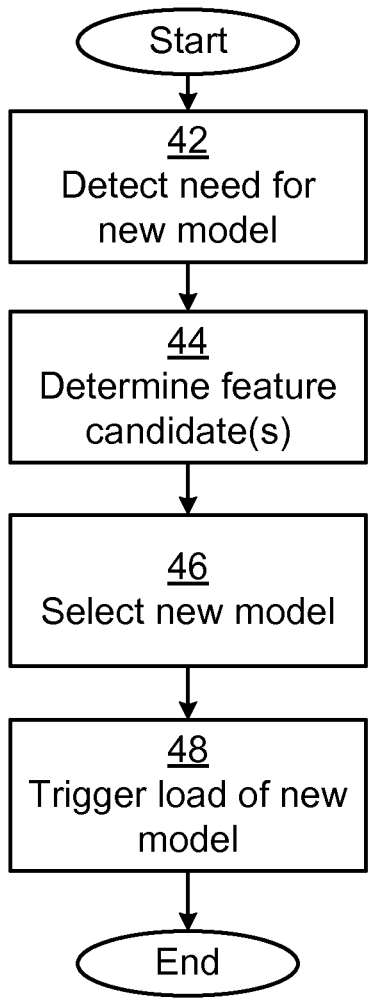
FIGS. 4A-E are flow charts illustrating embodiments of methods for dynamically selecting a learning model for a sensor device.

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

According to embodiments herein, it is provided a way to dynamically select and exchange the learning model in the sensor device. A sensor device is a constrained device which has a limited number of bytes of memory for a feature vector as opposed to a learning model implemented in a server where the feature vector can include all sensor data. The selection is performed based on information of performance of a currently loaded learning model and analysis of relevant sensor data, to thereby dynamically select the most suitable learning model.

FIG. 1 is a schematic diagram illustrating an environment in which embodiments presented herein can be applied. The environment of FIG. 1 will be described, also with reference to FIG. 2, which is a schematic diagram illustrating an embodiment of a sensor device of FIG. 1.

A user 10 causes the sensor device 2 to sense one or more physical quantities, such as movements. The sensor device 2 comprises sensors 3a-b, in this example two sensors. It is to be noted that the sensor device 2 can comprise any suitable number of sensors. The sensors 3a-b can e.g. be any one or more of an accelerometer, a gyroscope, blood analyser, blood pressure sensor, etc. Each sensor 3a or 3b provides sensor data in the form of one or more features. For instance, when the sensor device 2 is a wearable, the first sensor 3a can be an accelerometer and the second sensor 3b can be a gyroscope. Both of the accelerometer and the gyroscope can be implemented using an IMU (Inertial Measurement Unit). The first sensor 3a then provides three features in the form of x-acceleration, y-acceleration and z-acceleration. The second sensor 3b also provides three features in the form of yaw, pitch and roll.

The sensor device 2 can e.g. be a wearable device, such as a wristband, smartwatch, necklace, etc. and can be used e.g. to obtain medical data of the user 10 and/or be used as a computing device with sensor based input and suitable output, e.g. screen, sound, vibrations, etc.

The sensor device 2 can be a constrained device, implying that the sensor device has substantial constraints in e.g. memory, processing and/or power requirements.

The sensor device 2 can be connected to a network 6, e.g. via any one or more suitable communication technologies, e.g. using Bluetooth or Bluetooth Low Energy (BLE), ZigBee, any of the IEEE 802.11x standards (also known as WiFi), cellular communication standard (e.g. LTE (Long Term Evolution), UMTS (Universal Mobile Telecommunications System) utilising W-CDMA (Wideband Code Division Multiplex), CDMA2000 (Code Division Multiple Access 2000), etc.

The sensor device 2 comprises a processor and a pattern recognition unit. The pattern recognition unit can be implemented using software or a dedicated hardware pattern recognition unit, having a constrained size for the input data. One example of a pattern recognition unit is CurieNeurons provided by General Vision. The CurieNeurons has 128 bytes for input data, and provides a bounded execution time which is a constant execution time for k-nearest neighbours (k-NN) or of RBFN (Radial Basis Function Networks) matching algorithms. Thanks to the parallel data recognition engine, the time is independent of the size of the learning model. The input vector comprises input values for all active sensors or selected input values of selected sensors.

The learning models (herein sometimes referred to simply as models) in the sensor device 2 can be stored locally or can be downloaded from a server 7 when needed.

A server 7 is also connected to the network 6. The server 7 can be implemented on any suitable computer capable of performing the server functions disclosed herein.

As mentioned above, there is a trend to move the intelligence to the edges of the network 6. Wearables are part of the trend, and can implement machine learning (ML) to interpret data from the sensors 3a-b. Most of the processing and decision making algorithms, e.g. using ML, used to perform detection of activities, gesture recognition, anomaly detection, etc. require computational costs which can be off-loaded to separate processing units, e.g. the Intel Quark microcontroller has the CurieNuerons as a pattern recognition engine. Hereinafter, the term ML is used; however, it is to be noted that the embodiments presented are also applicable to other learning models. Other learning models beyond the scope of statistical modelling include e.g. static and dynamical models. Dynamical models are used to describe outputs of a given environment using the given inputs with a runtime, which are usually described by difference or differential equations. Examples of such model structures are; linear and nonlinear models, block-oriented models, time or parameter varying models.

ML algorithms typically involve a learning phase and, in the case of wearables, they may depend on the person using the wearable and where the sensor device 2 is located in relation to body of the user. Consider the case of using a ML algorithm for gesture recognition in a smartwatch. If the ML algorithm is trained for person A in the left wrist and if person A swaps the smartwatch to the right wrist, there is a high probability that the gestures will be misclassified or not classified at all. Moreover, if a person B uses the same smartwatch, the gestures of person B will most likely not be properly classified, i.e. a misclassification or not classified.

In the prior art, it is assumed that the trained model is used according to the training data (e.g. same person, same body part) and are not robust to large input data variations from the training data. Moreover, detection and analysis has not been done in the sensor device 2 of how well the model used in a sensor device 2 is performing in the sensor device 2.

The limited processor power of many sensor devices 2 has a large impact on the time an algorithm takes to be computed. ML algorithms implemented in software on a generic processor usually have a complexity of at least O(n) or worse, where O( ) refers to the complexity and n refers to the size of the model, e.g. expressed in number of neurons (see below for description of neurons). In software implementation on a generic processor, there is also linear complexity with the input data size. This implies that the larger the model and the data are, the longer it takes to compute. Therefore, hardware accelerators are commonly used as part of the sensor device 2, either included in a microprocessor, in separate ASICs (Application Specific Integrated Circuits) or other separate units, which can provide O(1) algorithms by parallelising the input data, as illustrated in FIGS. 3A-C and described below. For example, the Intel Quark with a pattern recognition unit provides O(1) algorithm, i.e. the complexity does not depend on the number of neurons, for the k-nearest neighbours and RFBN (Radial Basis Function Networks) with a certain input data size.

When the ML algorithms are implemented in software on a sensor device 2, the limited processor power limits the amount of data that can be processed and thus has an impact on the size of the model and input feature vectors. This is due to the software implementation of the algorithm having O(n) complexity. On the other hand, when using hardware accelerators, chipsets forming part of the hardware implementation have limited memory available. Hardware accelerators are chipsets built for a specific task to run that very efficiently. Current hardware accelerators for pattern recognition and learning models are restricted in terms of: number of bytes for the input vector/reference vector (which limits the sensor data that can be used), number of reference vectors (or neurons in this context) to compare to the input data, and number of classification outputs. Consequently, the memory of the hardware implementation limits the size of the model and the input feature vector making it difficult to process a large model with all the sensor data and all the classification output desired, which a model in a powerful server can easily process.

Due to the limitation of the size of the model and the input feature vector, dividing and reducing the model is needed to fit the memory of the hardware accelerator or other pattern recognition unit. Since different models can relate to different input data, the model applied at any one time should reflect current the sensor data.

Battery consumption of the processor and sensors 3*a*-*b* plays an important role in constrained devices, i.e. sensor devices 2. If a multi-purpose sensor device 2 has all its sensors 3*a*-*b* enabled continuously, even when not used, the battery will drain quickly.

Hence, according to embodiments herein, it is provided a way is provided to dynamically select and exchange the learning model in the sensor device 2. A sensor device 2 has a limited number of bytes of memory for the feature vector as opposed to a model implemented in a server 7 where the feature vector can include all sensor data. According to embodiments herein, the exchange and selection of model is based on information of performance of a currently loaded model and analysis of relevant sensor data, to thereby dynamically select the most suitable learning model.

Embodiments presented herein allow a sensor device 2, with limited size for input vector for the ML model, to exchange the ML model when needed. The ability to exchange ML models is relevant in sensor devices 2 because the limited size of the models implies that the model is trained for a specific application. For example, a model with all accelerometer and gyroscope data can be used for: gesture recognition, activity tracking, step counters, etc. However, on sensor devices 2 the same model is divided to be able to comply with resource limitations. Hence, the ability to dynamically exchange ML models enables a sensor device 2 to be used for multiple types of applications without any external intervention.

As described in more detail below, the ML model can be selected and exchanged using real-time analysis of the performance of the current ML model and dynamics of the sensor data. This process is performed in a model determiner as described in more detail below. The whole process can be performed in real-time with minimum interruption and downtime for the classification output and operates without the need for any user interaction.

If a new model is needed, relevant features are detected from all the available features, as explained in more detail below. In this way, only the sensors 3*a*-*b* that provide relevant data are going to be used. Thus, battery life of the sensor device 2 can be increased by disabling any unused sensors 3*a*-*b*. Additionally, a subset of features can be selected from a multi feature sensor 3*a*-*b* when the sensor 3*a*-*b* provides sensor data for features which are not used by the model. By only using relevant features, computational cost and battery consumption is reduced.

With the relevant feature candidates determined, a selection of the new model is performed as described below in more detail. The selection is based on the feature candidates and their characteristics. If a model determiner has a storage unit, this step can be performed without any interaction with other devices. If the model determiner has communication means, it can benefit from information from the other devices, such as neighbouring devices that are within range of the sensor device 2 and are used for the same purpose.

The use of only the relevant sensor data or the subset of the sensor data is crucial in sensor devices 2. Sensor devices 2 have a limited number of bytes in memory for the feature vector, thus a limited model.

When a new model is selected, the model is loaded in a pattern recognition unit of the sensor device 2, so that the model can be used with the minimum downtime for the model usage. This solution allows the model exchange to occur quickly and without any user input and is thus transparent to the user 10. Thus, embodiments presented herein can be applied in wearables without human-machine interface, or on sensor devices that are not used by people but by machines, e.g. devices which classify behaviours or malfunctioning of an industrial machine, a component of a vehicle or a home appliance.

FIGS. 3A-C are schematic diagrams illustrating the use of a machine learning model which can be applied in the embodiment of FIG. 1. First, the use of neurons in machine learning models will be explained. The available models in the storage of the sensor device are pre-trained. All the parameters, thresholds and models used by the sensor device can also be pre-defined.

The internal data used in pattern recognition can be defined as input data.

Input data is data which is to be compared with loaded reference vectors. For example, for gesture recognition, if accelerometer ($acc_x$, $acc_y$, $acc_z$) and gyroscope ($g_x$, $g_y$, $g_z$) are used, the input data is defined as $$\text{input}_{data}(t)=[acc_x(t-T)\,acc_y(t-T)\,acc_z(t-T)\,g_x(t-T)\,g_y(t-T)\,g_z(t-T)\ldots]$$

The length, i.e. data size, is of the input data may be defined by $$len(\text{input}_{data}(t)) = \frac{T}{h} * 2 * 3 = 6\frac{T}{h},$$

(two sets of three input data values), where t is a time interval, and h is the time between samples A neuron, in this context, is considered the data that contains the information related to the reference vector, the output value and related data to make the neuron to be fired. There are a limited number of neurons available in a sensor device. The components of the neuron and their definitions are:

Reference vector (RV): vector of data to compare the input with. For example, for a gesture X, one of the reference vectors can be defined as $RV_n=[racc_x(T)racc_y(T)racc_z(T)rg_x(T)rg_y(T)rg_z(T) \ldots ]$, where $$len(RV) = \frac{T}{h} * 6.$$

Size S, defined as $$S = len(RV) = \frac{T}{h} * \#sensors$$

is a key characteristic (limitation) of the pattern recognition unit, where #sensors indicate the number of sensors represented in input data. Indicates the size of the input data and the reference vector (RV).

Active influence field (AIF): number that defines the maximum distance value between the reference data and the input data, so that the neuron is fired, i.e. activated, such that the output value is provided. For example, if the $|D(\text{input}_{data}, RV)| < AIF$ then the neuron is fired.

Minimum influence field (MIF): minimum value that the active influence field could get. min(AIF)=MIF. It's a characteristic of the neuron.

Context identifier (CID): if multiple contexts are available in the pattern recognition unit, this identifier indicates which context the pattern belongs to. A context is used to differentiate multiple independent scenarios, for example CID=X is used for gesture recognition, and CID=Y is used for heart rate pulse monitoring.

Classifier: output value selected when the distance between the reference vector and the input data is below the active influence field (AIF). When this happens, we say that the pattern/neuron has been fired with the output value.

Output value: is the value that identifies the result of the neuron. For example, gesture X gets value X, and gesture Y, gets value Y. Multiple neurons could have the same output value.

Reference model (also referred to as the model or ML model): set of neurons to compare with the input data to be able to classify the input.

Context: a group of reference models. Depending on the capabilities of the pattern recognition, multiple contexts can be used for different classifications problems (sequentially or in parallel). For example, one context is used to classify data from the IMU and recognise gestures, and another use may be to monitor activities (walking, running, cycling, etc.) based on the IMU.

Furthermore, the following concepts are used herein:

Features: set of data used as input to the pattern recognition unit. The input data is compared to the reference vector (RV) in the neuron when a classification is triggered. One example of a feature is acceleration in x direction, $acc_x$. Another example of a feature is current pulse of the user.

Relevant sensor: sensor 3a-b in the sensor device 2 that provides relevant information. This corresponds to a feature candidate for the new model. For example, a sensor 3a-b may be considered relevant when it has high variations on its values; the values exceed a certain threshold; or cases where the features are more relevant than other.

Relevant sensor data: a single sensor 3a-b could provide multiple sensor data, which might be redundant or irrelevant for a certain application. For example, an IMU that provides accelerometer ($acc_x, acc_y, acc_z$) and gyroscope ($g_x, g_y, g_z$) data for all the coordinates, but only a subset, $acc_x, acc_y$ and $g_x, g_z$, might be relevant for a particular model.

Fired neuron: the neuron which has a distance between the input data and the reference vector that is lower than the active influence field. $|D(\text{input}_{data}, RV)| < AIF$. If a neuron is fired, a classification value is given as output. Several distance functions can be available in the pattern recognition unit. For example, the CurieNeurons provides Norm L1 (Manhattan) and Norm LSUP.

Correct classification: in a context C, a classification is considered to be correct when all the firing neurons have the same classification value.

Misclassification: in a context C, a classification is considered to be a misclassification when not all the neurons have the same classification value.

No classification: in a context C, a classification is considered to be a no classification when no neurons are fired.

Looking now to FIGS. 3A-C, the classification process is illustrated there when a particular model is loaded. The model is arranged to accept input data 13 at the top. The same data is provided to four neurons 12a-d. Each neuron 12a-d provides a particular classification. Many more neurons may be provided than the four in the simple example illustrated in FIGS. 3A-C.

FIG. 3A illustrates a situation when no input data is provided, where the first neuron 12a and the third neuron 12C each provide a first classification 15a when fired. Moreover, the second neuron 12b and the fourth neuron 12d each provide a second classification 15b when fired.

In FIG. 3B, the input data is represented by d1, which contain all sensor data from the sensors of the sensor device 2 at a particular point in time. The input data d1 is analysed by all the neurons and in FIG. 3B, after which this results in the firing only of the first neuron 12a, indicated by the neuron border being emphasised. Hence, the only classification from the model based on input data d1 is the first classification 15a. This is considered a correct classification.

In FIG. 3C, the input data is represented by d2, which contain all sensor data from the sensors 3a-b of the sensor device 2 at a particular point in time. The input data d2 is analysed by all the neurons and in FIG. 3C, after which this results in the firing of the first neuron 12a and the fourth neuron 12d, indicated by the respective neuron borders being emphasised. Hence, the classification from the model based on input data d2 is both the first classification 15a and the second classification 15b. As defined above, this inconsistency is considered a misclassification.

FIGS. 4A-E are flow charts illustrating embodiments of methods for dynamically selecting a learning model for a sensor device 2, where the sensor device 2 comprises at least one sensor (3a or 3b). As explained above, the learning model (e.g. ML model) is configured for determining output data based on sensor data from the at least one sensor (3a or 3b).

In a detect need for new model step 42, the model determiner detects a need for a new learning model for the sensor device 2. This can be based on the performance of a currently loaded learning model in the sensor device 2. Alternatively, a new model is needed e.g. when no model is currently loaded, e.g. after a factory reset, when a sensor device 2 could be without any model loaded in the pattern recognition unit, while a number of models are available in storage.

In this step, an analysis of the performance of the currently loaded model(s) is performed to identify if the correct device operation occurs or a model exchange should be triggered. Gathering real time data of the performance, it is possible to identify if the model selected is working or not. The parameters (thresholds/model) mentioned in this step are defined for each of the sensor (3a or 3b) individually. These parameters can be defined in the model build process based on experimentation.

In one embodiment, the need for a new model is identified when a model in the sensor device 2 does not fire any neuron within T number of seconds. When no neuron is fired, it indicates that the wrong model has been loaded in the sensor device 2. In such an embodiment, the period T could be a function of the model that is active, T=f (model), e.g. the dynamics of a model identifying gestures is not the same as the changes in room temperatures. By defining a customised period T per model, we assure that a classifier (set of neuron/patterns) gets its statistics according to its dynamics. As an example, given a number of neurons not fired (NNF) and a threshold $L_h$, then the identification of new model need is performed when $NNF>L_h$. The threshold $L_h$ can e.g. be defined from experiments at model build time.

In a determine feature candidate step 44, the model determiner determines at least one feature candidate based on sensor data from the at least one sensor (3a or 3b). Each one of the at least one feature candidate is a separate feature and is thus associated with a different source of sensor data.

After the need for a new model is identified, this step provides a way to detect, from all the sensor data available in the sensor device 2, the sensors 3a-b that provide relevant data and can potentially become features of the new model, i.e. are feature candidates. At this step, all sensors 3a-b are enabled and powered.

In one embodiment, the feature candidates (FC) are inferred by comparing the sensor data available in the sensor device 2 at instant t to a threshold $L_v$. As an example, given sensor data point D, if $D>L_v$, then the feature of the sensor is selected as feature candidate. In such embodiment, the thresholds can be defined depending on the models used in the classification.

In another embodiment, the feature candidates (FC) are inferred by comparing characteristics of a (time series) vector of sensor data for each feature with a defined threshold $L_v$. The characteristics can be statistical metrics like mean, median or standard deviation of the sensor data. As an example, given a vector of sensor data D(t)=[d(t−T) d(t−T+h) d(t−T+2h) .... d(t)] with sampling period h during an interval T; if mean(D)>$L_v$, then the feature of the sensor data is selected as feature candidate. In such embodiment, the thresholds can be defined depending on the expected data values for all the models stored using sensor data.

In another embodiment, the feature candidates are inferred based on another context in the pattern recognition unit. Such context is only used to infer the feature candidates. It consists on N number of models, where N is the number of sensor data available in the sensor device 2. As an example, vectors of sensor data for features $F_1$, $F_2$, $F_3$ are used as a sequential input to the pattern recognition unit. If $F_1$ gets a correct classification, then the feature "1" is selected as feature candidate; same applies to $F_2$ and $F_3$. In such embodiment, the memory usage for the pattern recognition increases but the feature selection will be more accurate without any other external source of information.

In another embodiment, the feature candidates (FC) are inferred by applying the previous embodiments to subsets of the sensor data. As an example, given IMU sensor ($F_{IMU}$={$F_{acc}$, $F_{gir}$}) providing accelerometer ($F_{acc}$={$acc_x$, $acc_y$, $acc_z$}) and gyroscope ($F_{gir}$={$g_x$, $g_y$, $g_z$}) data, $F_{acc}$ and $F_{gir}$ are analysed as independent features in the previous embodiments.

In another embodiment, the sensor data is normalised over time for each sensor 3a-b prior to determining the at least one feature candidate. The vectors of sensor data can be standardised (normalised) e.g. using z-score. That provides a way to compare all the sensor data using common metrics as mean, mean or standard deviation. Given the limited memory, and the resource requirements to compute the standard deviation of the whole sensor data, an approximation can be made by taking the range of the sensor. As an example, given a vector D(t)=[d(t−T) d(t−T+h) d(t−T+2h) d(t)][d(t−T) d(t−T+h) d(t−T+2h) . . . d(t)] we apply the transformation $$z(t) = \frac{d(t) - \text{mean}(D(t))}{\sigma} \text{ where } \sigma = \frac{\text{sensor\_range}}{3}.$$

In another embodiment, the feature candidates (FC) are inferred by computing characteristics of a vector of sensor data (time-series data). Some metrics can provide a normalised value indicating the level of information that the sensor data contains. With that, this embodiment provides a sorted list of FCs based on the relevancy of the sensor data. And it provides a way to identify the relevant features without any previous knowledge of the data. As an example, given N vectors of different sensor data $D_n$(t)=[d_n(t−T) d_n(t−T+h) d_n(t−T+2h) . . . d_n(t)] with sampling period h during an interval T; the approximate entropy of such vector is computed to provide a list of FC sorted in descending order. Other metrics to measure dispersion of continuous data like interquartile range with detection of outliers (Q1, Q3) can be used.

In a select new model step 46, the model determiner selects a new learning model, from a set of candidate learning models. The selection is based on the at least one feature candidate and input features of each one of the candidate learning models. As an example, a model A with features $F_A$={$F_1$, $F_2$} is selected if $F_A$={$F_1$, $F_2$} ⊂ FC.

In one embodiment, the candidate learning model, from the set of candidate learning models, is selected that has the greatest number of overlapping features with the at least one feature candidate. In other words, a new model is selected whose features belong to the feature candidates and the cardinality of the intersection is the maximum of all models. This is described in the following formula: As an example, given model A with features $F_A=\{F_1, F_2\}$, model B with $F_B=\{F_2, F_3\}$, and $FC=\{F_1, F_2\}$; model A is selected because $|F_A \cap FC|>|F_B \cap FC|$. In such embodiment, we assure that the model with most feature candidates is selected.

In another embodiment, if for every feature set ($F_i$) of model "i" an $F_i$ does not exist that belongs to FC ($\forall F_i \; \nexists \; F_i \subset FC$), the selection of a new model is done when at least one feature of $F_i$ belongs to FC ($F_A \cap FC \neq \emptyset$). As an example, given model A with features $F_A=\{F_1\}$, model B with $F_B=\{F_3\}$, and $FC=\{F_1, F_2\}$; model A is selected because it is the only model that has a feature from the FC.

In one embodiment, the selected model uses a subset of the sensor data. As an example, a model uses a subset of the IMU sensor data ($F_A'$). Given $F_{IMU}=\{F_{acc}, F_{gir}\}$ providing accelerometer $F_{acc}=\{acc_x, acc_y, acc_z\}$ and gyroscope $F_{gir}=\{g_x, g_y, g_z\}$ data, the model uses only, for example, the subset $F_A'=\{acc_x, acc_y, g_x\}$. In such embodiment, the number of bytes of memory used for the input data can be reduced, obtaining an energy reduction due to the reduced computation needed. It is also important because the pattern recognition unit usually is constrained in the number of bytes of memory for the input data. For example, in the CurieNeutons from General Vision, the size of the input data (and model) is limited to 128 bytes.

In a trigger load of new model step 48, the model determiner triggers the new learning model to be loaded on the sensor device 2, replacing the currently loaded learning model. When the model determiner is provided as part of the sensor device 2, no external communication is needed; the model determiner simply locally ensures the new learning model is loaded. When the model determiner is provided as part of the server, this step comprises transmitting a command to the sensor device 2 to load the new learning model. The new learning model is subsequently used in the pattern recognition unit in the sensor device 2.

In one embodiment, to load a model, a new model is received from storage. When the model is received, the processing unit loads the new model in the pattern recognition unit. As an example, the model can be loaded in the pattern recognition and can be stored in the same context as the previous model. Since only local storage is used, the transfer time between the storage and the pattern recognition unit is considered negligible, and therefore, negligible downtime.

In an additional embodiment, multiple models can be loaded simultaneously in the pattern recognition unit if multiple contexts are available, and enough space (e.g. in terms neurons) is available in the pattern recognition unit.

Figure 4B:
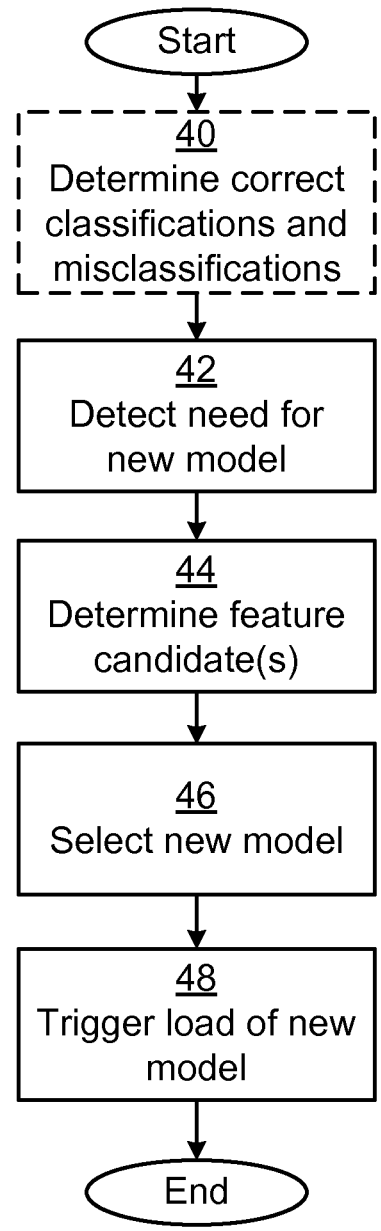

Looking now to FIG. 4B, only new or modified steps compared to the steps of FIG. 4A will be described.

In an optional determine correct classifications and misclassifications step 40, the model determiner determines a number of correct classifications and number of misclassifications, during a time period, of the currently loaded learning model. Optionally, this step further comprises determining a number of no classifications, during the time period, of the currently loaded learning model.

When step 40 is performed, the detect need for new model step 42 is based at least partly on performance based on the number of correct classifications and the number of misclassifications. When the number of no classifications is determined, this can also form part of the basis for the performance.

Hence, the need for a new model is defined as a function of the number of misclassification (MC) and the number correct classification (CC) during a time period T. In such embodiment, the period T could be a function of the model that is active (contexts) T=f (model). A misclassification leads to non-conclusive results, and therefore an indication of a wrong model being used. As an example, given CC and MC, the decision on the need for a new model is a function relating both values; if CC<MC and MC>$L_h$, given $L_h$ a threshold value, then need for a new model is identified.

In another embodiment, the need for a new model is identified based on a function relating a vector of samples of number of correct classifications (CC), misclassifications (MC) and no classifications (NC), with sampling period h, during an time period T. The function could be any of the characteristics applicable to vectors like mean, median, standard deviation, variance, entropy, etc. As an example, given the vectors $V_{cc}$, $V_{MC}$ and $V_{NC}$ in the form $V_x=[a, b, c, d, \ldots]$ with $$len(VX) = \frac{T}{h}$$

elements, where a, b, c, d are the numbers of CC, MC or NC occurred within period T, if such characteristics are above a defined threshold for $V_{NC}$ and $V_{MC}$ or below a threshold for $V_{cc}$, the need for a new model is identified. For example, if $|mean(V_{NC})|>L_{h1}$ or $|mean(V_{MC})|>L_{h2}$ or $|mean(V_{CC})|<L_{h3}$, the need for a new model is identified.

In another embodiment, the need for a new model is identified based on a function relating a vector of samples of number of correct classifications (CC), misclassifications (MC) and no classifications (NC), with sampling period h, during an interval T. As an example, given the vectors $V_{cc}$, $V_{MC}$ and $V_{NC}$; if $sum(V_{cc}, V_{MC})>sum(V_{cc})$, the need for a new model is identified.

In another embodiment, the need for a new model is identified based on another context in the pattern recognition unit. Such context expects the vectors $V_{CC}$, $V_{MC}$ and $V_{NC}$ or any combination of their characteristics as input data for the neurons. After the context for detecting the new model is used, the model determiner switches back to the previous context and continues its normal operation or to the next step if the need for a new model is identified. As an example, context X is used for gesture recognition and context Y is used to detect the need for a new model; to change context, the application sets the context register in the pattern recognition unit to X or Y. The context-switching time is negligible, by changing the value in a register, the context can be switched.

Figure 4C:
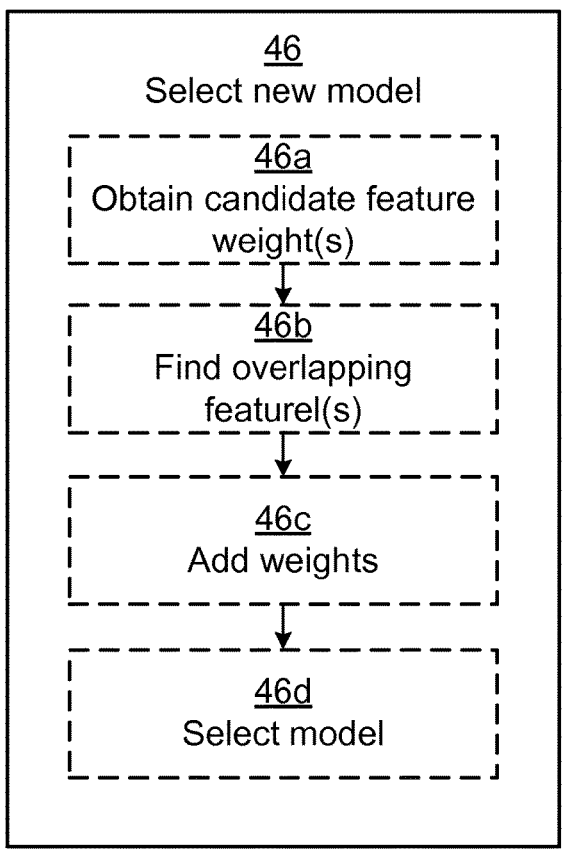

FIG. 4C illustrates optional substeps of the select new model step 46 according to one embodiment where candidate feature weights are applied.

In an optional obtain candidate feature weights step 46a, the model determiner obtains a candidate feature weight for each feature candidate.

In an additional embodiment, the list of FCs contains a normalised weight for each of the value. Optionally, the list of FCs is also sorted by the level of relevancy. This embodiment allows a more accurate selection of the model based of a weight of each sensor data. As an example, the FC vector will look as follows: C=[{weight: 1, value: "$F_1$"}, {weight: 0.5, value:"$F_2$"}, {weight: 0.1, value: "$F_3$"}]

In one embodiment, the selection of a new model with a list of FCs sorted with weights is done by performance a matching algorithm (as presented above) with the n-most relevant features. As an example, given a sorted list= [{weight: 1, value: "$F_1$"}, {weight:0.5, value:"$F_3$"}, {weight: 0.1, value: "$F_2$"}], [weight: 0.01, value: "$F_4$")], the list is truncated by the three most relevant features yielding FC'= [$F_1$, $F_3$, $F_2$], after which the matching is performed to the models available.

In an additional embodiment, the selection of features can be performed by selecting the features given a certain threshold weight.

In an optional find overlapping feature(s) step 46b, the model determiner finds, for each candidate learning model, a set of overlapping features consisting of any feature candidates overlapping the input features. In other words, the set of overlapping features is an intersection of the feature candidates and the input features.

In an optional add weights step 46c, the model determiner adds up, for each candidate learning model, the candidate feature weights of the candidate features forming part of the set of overlapping features. This yields a weighted candidate feature score.

In an optional select model step 46d, the model determiner selects the new learning model to be the candidate learning model having the greatest weighted candidate feature score.

Figure 4D:
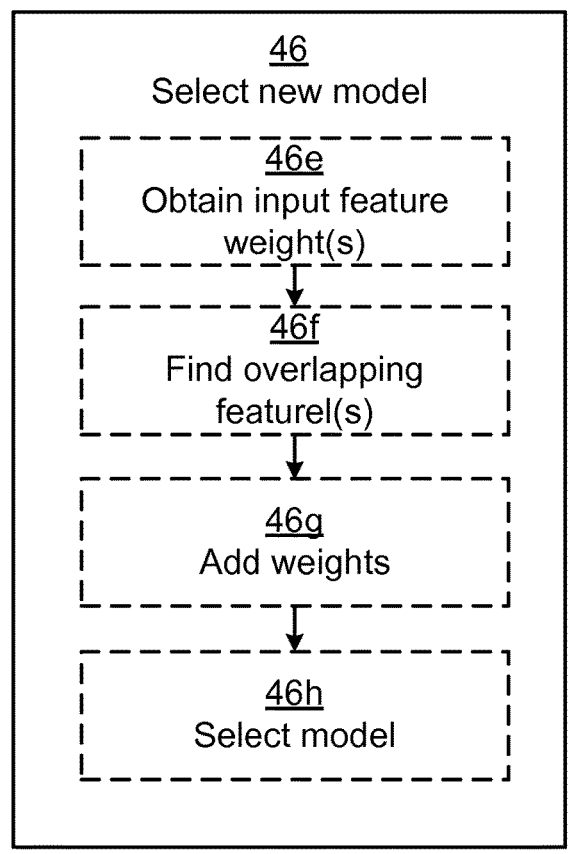

FIG. 4D illustrates optional substeps of the select new model step 46 according to one embodiment where input feature weights are applied.

In an optional obtain input feature weights step 46e, the model determiner obtains, for each candidate learning model, an input feature weight for each input feature. Hence, the models have a list of input features with weights defining the respective importance in the model. That information can be used to optimise the algorithm to select the proper model. As an example, given models $M_1$=[$F_3$, $F_2$] and $M_2$=[$F_1$, $F_2$, $F_3$] with the features sorted by relevance, and given FC'=[$F_1$, $F_3$, $F_2$], the model selected will be $M_1$.

In one embodiment, a pre-trained model could be used to select the new model for the application. This embodiment assumes that the list of FCs is provided with weights. This may provide a higher precision in the model selection but also implies a longer duration (since neurons are copied into the pattern recognition unit). Moreover, extra effort is needed to build the pre-trained model during the design phase. As an example, the input vector for the pattern recognition is defined as [$W_{F1}$ $W_{F2}$ ... $W_{FN}$] with the weights for each of the N features (Fn), and a model that based on the weights gives the model is closer to a pattern. In this case, an algorithm is selected that always provides the closest to the input pattern, for example k-nearest neighbours.

In an optional find overlapping feature(s) step 46f, the model determiner finds, for each candidate learning model, a set of overlapping features being input features overlapping the at least one feature candidate. In other words, the set of overlapping features is an intersection of the feature candidates and the input features.

In an optional add weights step 46g, the model determiner adds up, for each candidate learning model, the input feature weights for the input features of the overlapping features. This yields a weighted input feature score.

In an optional select model step 46h, the model determiner selects the new learning model to be the candidate learning model having the greatest weighted input feature score.

Figure 4E:
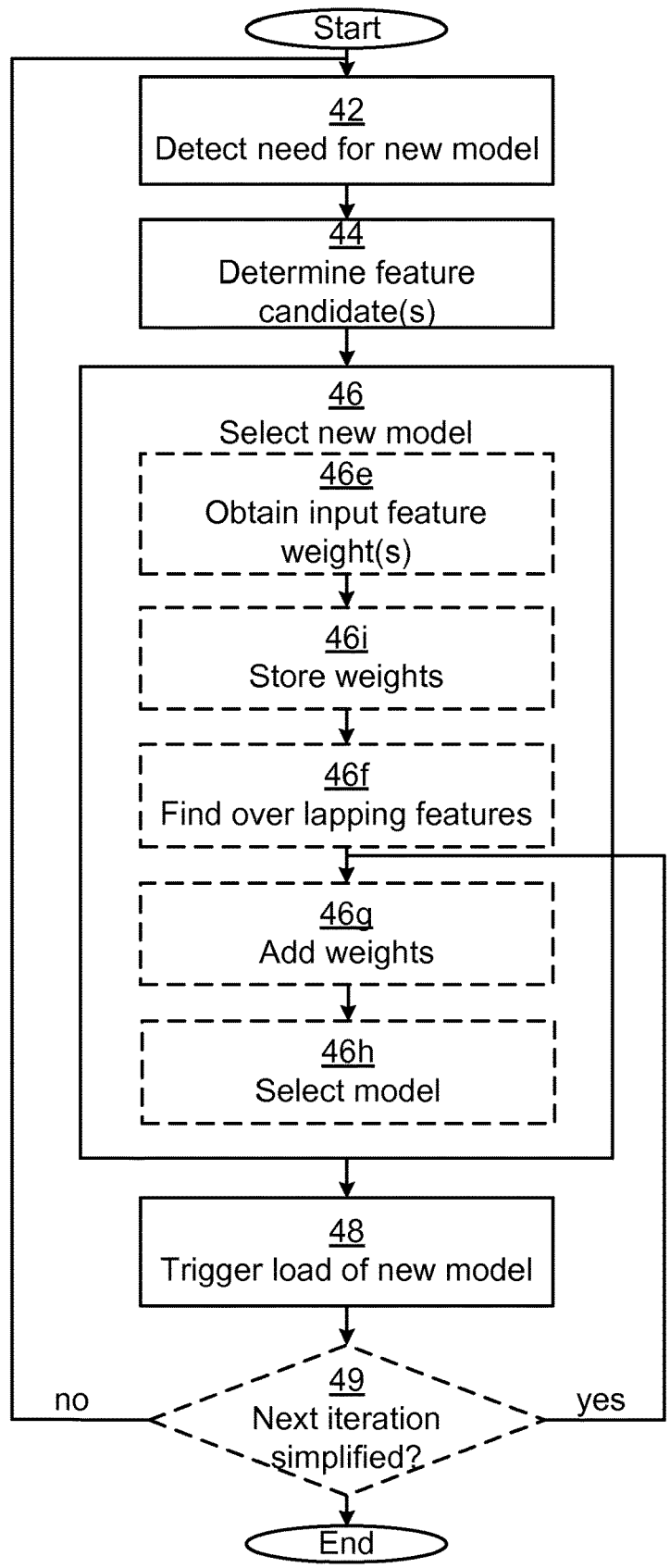

Looking now to FIG. 4E, an embodiment comprising simplified iterations is shown. The select new model step 46 here comprises an optional store weights step 46i, in which the model determiner stores the input feature weights associated with respective input features as a set of input feature weights.

After the trigger load of new model step 48, there is an optional conditional next iteration simplified step 49, in which the model determiner evaluates whether a next iteration of the method is to be a full iteration or a simplified iteration. This evaluation can be based on a timeout, e.g. that at least once during a certain period the full iteration needs to be performed. Alternatively, the evaluation can be based on the number of iterations, e.g. one full iteration every N times, where is any natural number.

When the next iteration is to be a simplified iteration, the method returns to the optional add weights step 46g (where the stored weights are used), optionally via a delay step (not shown). Otherwise, the method returns to the detect need for new model step 42.

In this way, the simple iteration includes weighted evaluation of the different input features. However, the simple iteration does not include the resource intensive determine feature candidate(s) step 44 and the find overlapping features step 46f. In this way, the model determination is much more efficient in the simplified iteration. However, since the overlapping features do not change in the simplified iteration, every so often, the full method should be performed.

Hence, if multiple models are selected as candidates from the previous step, the list can be stored and used sequentially depending of the performance of the previous model. For example, if models [A, B] are selected, A will be loaded and B, pending until the timeout period expired or the model A gets the expected performance.

Implementation Scenario

An example implementation scenario will now be described to illustrate the use of embodiments presented herein. The scenario is performed in a system that comprises a: wristband of a user. The wristband comprises a heart rate monitor ($F_1$) and an IMU sensor ($F_2$). In this application there are three models. For gesture recognition there is a first model A with features $F_2$ for left wrist usage and a second model B for right wrist usage. Furthermore, there is a third model C for activity tracking using features $F_1$ and $F_2$.

There are thereby two example applications. A first application is a human-machine interface where the sensor device 2 (with $F_2$) is used to interact with an application by means of user gestures. For example, an image processing application with zoom in/out. A second application is sport activity tracking, where the sensor device 2 (with features $F_1$ and $F_2$) is used to monitor sport activities that the user performs.

Assume that the sensor device 2 is initially loaded with by the wristband having the gesture recognition model for the left wrist (model A).

Initially the user has wristband on his left wrist. After powering on the sensor device 2, step 42 checks if a model is already loaded, finding model A being loaded.

At this point, model A is used and IMU sensor ($F_2$) is enabled, while $F_1$ remains disabled without consuming any battery.

Also as part of step 42, the sensor device 2 monitors the performance of the model and performs the classification simultaneously.

Using the pattern recognition unit, the classification is performed within a constant time (O(1) algorithm), and the real-time performance metrics of the model are taken automatically, with negligible processing time. If other contexts are used to detect the need for a new model, the classification time is added. The context switch time is negligible.

In this example, the pattern recognition does not detect any trigger since the user is not using the wristband as gesture recognition. At this point, step 44 is triggered. Step 44 is used to analyse which are the features candidates that may be used in the sensor device 2.

At this point, all sensors ($F_1$ and $F_2$) are enabled to identify the sensor data that should be used. During this period, the classification is not enabled. Therefore, the time at this stage is kept short, but at the same time, give a good estimation of the feature candidates.

After the execution of this step, a list of features is selected based on the computation of normalised metrics (such as z-score, interquartile range, entropy etc.). The sorted list of features based on their relevancy simplifies the selection of the model allowing the algorithm to skip this step (see FIG. 4E).

In this example, the user starts walking which implies an increase in heart rate ($F_1$) and changes in the IMU sensor data ($F_2$). Thus, $F_1$ and $F_2$ are selected as feature candidates (FC=[{weight: 1, value: "$F_1$"}, {weight:0.5, value:"$F_2$"}]). With the FC selected, step 46 is triggered.

With the feature candidates selected (FC), the system is ready to select which model(s) could be used. The implementation of this step depends on the sensor device 2:
1. storage/memory unit: all models are stored locally and decision is made in the sensor device 2. Time is negligible.
2. communication unit: models can be stored in another sensor device/server and the decision is done in collaboration with another devices/gateway. The duration for this is considerably higher when the transfer of the model is performed over the air and the decision is taken based on all other devices response.

To select the best model based on the FC on the previous step, step 46 compares the FC with the models available in the storage unit. Since model C has $F_1$ and $F_2$ as features, model C is selected. After the selection, step 48 is triggered to load model C in the pattern recognition unit.

At this point, model C is available in the main processor (from storage or communication unit) and then moved to the pattern recognition unit. Time is negligible because it is loading a model copy from the memory of the main processor to the pattern recognition unit.

After step 48 the method continues doing the monitoring of the new model (step 42), and identifies the need for a new model as soon as model C does not perform as expected.

Once the model is loaded, the classification output is enabled. Each classification takes a constant time independent from the data size or the number of neurons used in the context.

At this point, if the poor performance is detected within a short interval, the method continues loading the next model available in the list generated in step 46.

Figure 5A:
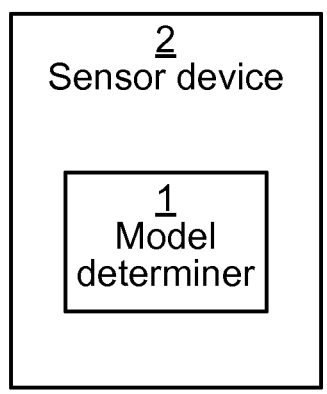
FIGS. 5A-B are schematic diagrams illustrating embodiments of the model determiner being implemented as part of a host device.
Figure 5B:
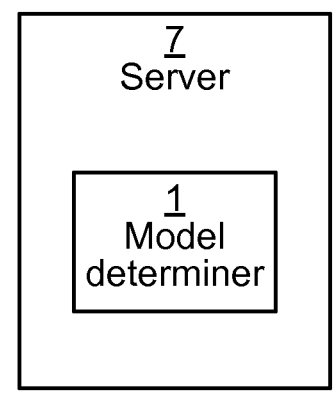

FIGS. 5A-B are schematic diagrams illustrating embodiments of the model determiner being implemented as part of a host device.

In FIG. 5A, an embodiment is shown where the model determiner 1 is implemented in the sensor device 2, i.e. the sensor device 2 is the host device for the model determiner 1. This allows the model determiner 1 to be performed locally, removing any need of communication for performing the embodiments presented herein.

In FIG. 5B, an embodiment is shown where the model determiner 1 is implemented in the server 7, i.e. the server 7 is the host device for the model determiner 1. This reduces resource requirements on the sensor device 2, since the processing of embodiments presented herein is implemented on the server 7.

Figure 6:
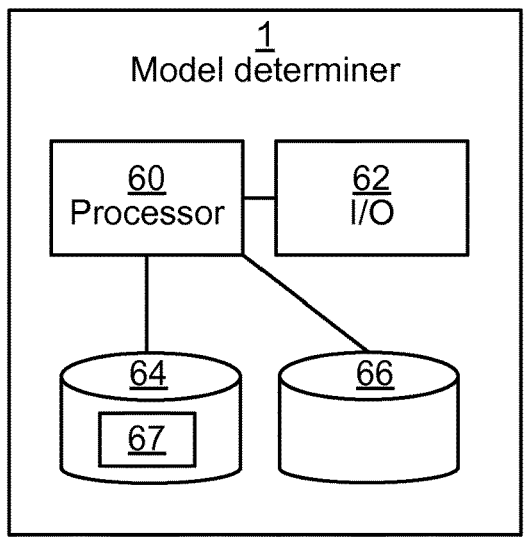
FIG. 6 is a schematic diagram illustrating components of the model determiner of FIGS. 5A-B according to one embodiment.

FIG. 6 is a schematic diagram illustrating components of the model determiner 1 of FIGS. 5A-B according to one embodiment. It is to be noted that when the model determiner 1 is implemented in a host device, some or all components of FIG. 6 may be shared with the host device. A processor 60 is provided using any combination of one or more of a suitable central processing unit (CPU), multiprocessor, microcontroller, digital signal processor (DSP), application specific integrated circuit etc., capable of executing software instructions 67 stored in a memory 64, which can thus be a computer program product. The processor 60 can be configured to execute the method described with reference to FIGS. 4A-E above.

The memory 64 can be any combination of random access memory (RAM) and read only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of random access memory (RAM) and read only memory (ROM).

Other components of the model determiner 1 are omitted in order not to obscure the concepts presented herein.

Figure 7:
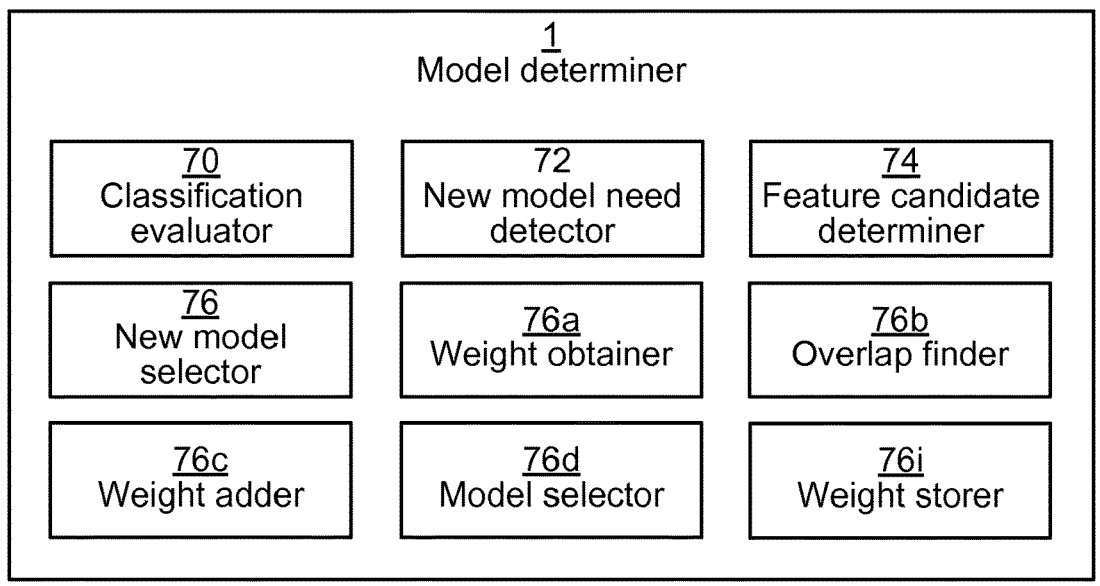
FIG. 7 is a schematic diagram showing functional modules of the model determiner of FIGS. 5A-B according to one embodiment.

FIG. 7 is a schematic diagram showing functional modules of the model determiner 1 of FIGS. 5A-B according to one embodiment. The modules are implemented using software instructions such as a computer program executing in the model determiner 1. Alternatively, or additionally, the modules are implemented using hardware, such as any one or more of an ASIC, an FPGA (Field Programmable Gate Array), or discrete logical circuits. The modules correspond to the steps in the methods illustrated in FIGS. 4A-4D.

A classification evaluator 70 corresponds to step 40. A new model need detector 72 corresponds to step 42. A feature candidate determiner 74 corresponds to step 44. A new model selector 76 corresponds to step 46. A weight obtainer 76a corresponds to steps 46a and 46e. An overlap finder 76b corresponds to steps 46b and 46f. A weight adder 76c corresponds to steps 46c and 46g. A model selector 76d corresponds to steps 46d and 46h A weight storer 76i corresponds to step 46i.

Figure 8:
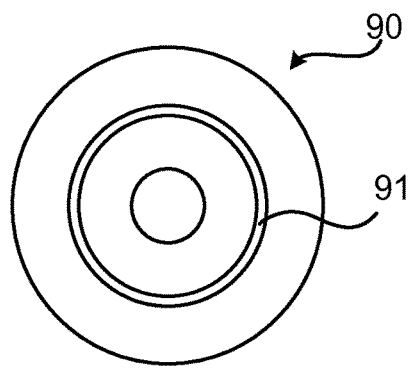
FIG. 8 shows one example of a computer program product comprising computer readable means.

FIG. 8 shows one example of a computer program product comprising computer readable means. On this computer readable means, a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 6. While the computer program 91 is here schematically shown as a track on the depicted optical disk, the computer program can be stored in any way which is suitable for the computer program product, such as a removable solid-state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:
1. A method for dynamically selecting a learning model for a sensor device comprising at least one sensor, the learning model being configured for determining output data based on sensor data from the at least one sensor, the method being performed in a model determiner and comprising the steps of:
- detecting a need for a new learning model for the sensor device based on performance of a currently loaded learning model in the sensor device;
- determining at least one feature candidate based on sensor data from the at least one sensor, wherein each one of the at least one feature candidate is associated with a different source of sensor data;
- selecting a new learning model, from a set of candidate learning models, based on the at least one feature candidate and input features of each one of the candidate learning models; and
- triggering the new learning model to be loaded on the sensor device, replacing the currently loaded learning model.

2. The method according to claim 1, further comprising the step of:
- determining a number of correct classifications and number of misclassifications, during a time period, of the currently loaded learning model;
- and wherein, in the step of detecting a need for a new learning model, the performance is based on the number of correct classifications and the number of misclassifications.

3. The method according to claim 2, wherein the step of determining further comprises determining a number of no classifications, during the time period, of the currently loaded learning model;
and wherein, in the step of detecting a need for a new learning model, the performance is based on the number of no classifications.

4. The method according to claim 1,
wherein, in the determining at least one feature candidate step, the sensor data is normalised over time for each sensor prior to determining the at least one feature candidate.

5. The method according to claim 1, wherein the step of selecting a new learning model comprises selecting the candidate learning model, from the set of candidate learning models, that has the greatest number of overlapping features with the at least one feature candidate.

6. The method according to claim 1, wherein the step of selecting a new learning model comprises the steps of:
- obtaining a candidate feature weight for each feature candidate;
- finding, for each candidate learning model, a set of overlapping features consisting of any feature candidates overlapping the input features;
- adding up, for each candidate learning model, the candidate feature weights of the candidate features forming part of the set of overlapping features, yielding a weighted candidate feature score; and
- selecting the new learning model to be the candidate learning model having the greatest weighted candidate feature score.

7. The method according to claim 1, wherein the step of selecting a new learning model comprises the steps of:
- obtaining, for each candidate learning model, an input feature weight for each input feature;
- finding, for each candidate learning model, a set of overlapping features being input features overlapping the at least one feature candidate;
- adding up, for each candidate learning model, the input feature weights for the input features of the overlapping features, yielding a weighted input feature score; and
- selecting the new learning model to be the candidate learning model having the greatest weighted input feature score.

8. The method according to claim 7, further comprising the step of: storing the input feature weights associated with respective input features as a set of input feature weights;
wherein for at least one subsequent iteration of the method, the step of determining at least one feature candidate is omitted, the step of obtaining an input feature weight is omitted, and the step of finding a set of overlapping features is omitted, and wherein the step of adding up is based on the stored set of input feature weights.

9. The method according to claim 1, wherein the step of detecting a need for a new learning model for the sensor device is also based on user input.

10. The method according to claim 1, wherein the learning model is a machine learning, ML, model.

11. A model determiner for dynamically selecting a learning model for a sensor device comprising at least one sensor, the learning model being configured for determining output data based on sensor data from the at least one sensor, the model determiner comprising:
- a processor; and
- a memory storing instructions that, when executed by the processor, cause the model determiner to:
  - detect a need for a new learning model for the sensor device based on performance of a currently loaded learning model in the sensor device;
  - determine at least one feature candidate based on sensor data from the at least one sensor, wherein each one of the at least one feature candidate is associated with a different source of sensor data;
  - select a new learning model, from a set of candidate learning models, based on the at least one feature candidate and input features of each one of the candidate learning models; and
  - trigger the new learning model to be loaded on the sensor device, replacing the currently loaded learning model.

12. The model determiner according to claim 11, further comprising instructions that, when executed by the processor, cause the model determiner to:
- determine a number of correct classifications and number of misclassifications, during a time period, of the currently loaded learning model;
- and wherein, the instructions to detect a need for a new learning model comprise instructions that, when executed by the processor, cause the model determiner to obtain the performance based on the number of correct classifications and the number of misclassifications.

13. The model determiner according to claim 12, wherein the instructions to determine further comprise instructions that, when executed by the processor, cause the model determiner to determine a number of no classifications, during the time period, of the currently loaded learning model;
and wherein the instructions to detect a need for a new learning model comprise instructions that, when executed by the processor, cause the model determiner to obtain the performance based on the number of no classifications.

14. The model determiner according to claim 11, wherein, the instructions to determine at least one feature candidate comprise instructions that, when executed by the processor, cause the model determiner to normalise the sensor data over time for each sensor prior to determining the at least one feature candidate.

15. The model determiner according to claim 11, wherein the instructions to select a new learning model comprise instructions that, when executed by the processor, cause the model determiner to select the candidate learning model, from the set of candidate learning models, that has the greatest number of overlapping features with the at least one feature candidate.

16. The model determiner according to claim 11, wherein the instructions to select a new learning model comprise instructions that, when executed by the processor, cause the model determiner to:
- obtain a candidate feature weight for each feature candidate;
- find, for each candidate learning model, a set of overlapping features consisting of any feature candidates overlapping the input features;
- add up, for each candidate learning model, the candidate feature weights of the candidate features forming part of the set of overlapping features, yielding a weighted candidate feature score; and
- select the new learning model to be the candidate learning model having the greatest weighted candidate feature score.

17. The model determiner according to claim 11, wherein the instructions to select a new learning model comprise instructions that, when executed by the processor, cause the model determiner to:
- obtain, for each candidate learning model, an input feature weight for each input feature;
- find, for each candidate learning model, a set of overlapping features being input features overlapping the at least one feature candidate;
- add up, for each candidate learning model, the input feature weights for the input features of the overlapping features, yielding a weighted input feature score; and
- select the new learning model to be the candidate learning model having the greatest weighted input feature score.

18. The model determiner according to claim 17, further comprising instructions that, when executed by the processor, cause the model determiner to:
- store the input feature weights associated with respective input features as a set of input feature weights;
- wherein for at least one subsequent iteration of the instructions, the instructions to determine at least one feature candidate are omitted, the instructions to obtain an input feature weight are omitted, and the instructions to find a set of overlapping features are omitted, and wherein the instructions to add up is based on the stored set of input feature weights.

19. The model determiner according to claim 11, wherein the instructions to detect a need for a new learning model for the sensor device is also based on user input.

20. A computer program for dynamically selecting a learning model for a sensor device comprising at least one sensor, the learning model being configured for determining output data based on sensor data from the at least one sensor, the computer program comprising computer program code which, when run on a model determiner causes the model determiner to:
- detect a need for a new learning model for the sensor device based on performance of a currently loaded learning model in the sensor device;
- determine at least one feature candidate based on sensor data from the at least one sensor, wherein each one of the at least one feature candidate is associated with a different source of sensor data;
- select a new learning model, from a set of candidate learning models, based on the at least one feature candidate and input features of each one of the candidate learning models; and
- trigger the new learning model to be loaded on the sensor device, replacing the currently loaded learning model.

* * * * *

UNITED STATES PATENT AND TRADEMARK OFFICE
CERTIFICATE OF CORRECTION

PATENT NO. : 11,580,452 B2
APPLICATION NO. : 16/768665
DATED : February 14, 2023
INVENTOR(S) : Hernandez Herranz et al.

It is certified that error appears in the above-identified patent and that said Letters Patent is hereby corrected as shown below:

On the Title Page

On Page 2, in Item (56), under "OTHER PUBLICATIONS", in Column 1, Line 6, delete "20160813044327" and insert -- 20160813044927 --, therefor.

On Page 2, in Item (56), under "OTHER PUBLICATIONS", in Column 1, Line 7, delete "documentatian" and insert -- documentation --, therefor.

In the Drawings

In Fig. 4C, Sheet 3 of 6, for Tag "46b", in Line 2, delete "featurel(s)" and insert -- feature(s) --, therefor.

In Fig. 4D, Sheet 3 of 6, for Tag "46f", in Line 2, delete "featurel(s)" and insert -- feature(s) --, therefor.

In the Specification

In Column 1, Line 23, delete "sport" and insert -- sports --, therefor.

In Column 6, Line 11, delete "(e.g." and insert -- e.g. --, therefor.

In Column 6, Line 43, delete "CurieNuerons" and insert -- CurieNeurons --, therefor.

In Column 9, Line 8, delete "t is" and insert -- T is --, therefor.

In Column 9, Line 9, delete "samples" and insert -- samples. --, therefor.

In Column 10, Line 47, delete "12C" and insert -- 12c --, therefor.

Signed and Sealed this
Fourteenth Day of November, 2023

Katherine Kelly Vidal
*Director of the United States Patent and Trademark Office*

CERTIFICATE OF CORRECTION (continued)
U.S. Pat. No. 11,580,452 B2

In Column 11, Line 20, delete "a" and insert -- if a --, therefor.

In Column 11, Line 32, delete "T=f (model)," and insert -- T=f(model), --, therefor.

In Column 12, Line 6, delete "on" and insert -- of --, therefor.

In Column 12, Line 20, delete "($F_{gir}$={$g_x$, $g_y$,$g_z$})" and insert -- ($F_{gir}$={$g_x$, $g_y$, $g_z$}) --, therefor.

In Column 12, Line 28, delete "as" and insert -- such as --, therefor.

In Column 12, Lines 32-33, delete "D(t)=[d(t–T) d(t–T+h) d(t–T+2h) d(t)]" and insert -- D(t)=[d(t–T) d(t–T+h) d(t–T+2h) . . . . d(t)] --, therefor.

In Column 13, Line 3, delete "|$F_A$ ∩n FC|" and insert -- |$F_A$ ∩ FC| --, therefor.

In Column 13, Line 15, delete "$acc_{y'}$," and insert -- $acc_y$, --, therefor.

In Column 13, Lines 22-23, delete "CurieNeutons" and insert -- CurieNeurons --, therefor.

In Column 13, Line 48, delete "terms" and insert -- terms of --, therefor.

In Column 13, Line 65, delete "number" and insert -- number of --, therefor.

In Column 14, Line 1, delete "T=f (model)." and insert -- T=f(model). --, therefor.

In Column 14, Line 11, delete "an" and insert -- a --, therefor.

In Column 14, Line 23, delete "occurred" and insert -- that occurred --, therefor.

In Column 14, Line 60, delete ""$F_1$}," and insert -- "$F_1$"}, --, therefor.

In Column 14, Line 61, delete "value:"$F_2$}," and insert -- value: "$F_2$"}, --, therefor.

In Column 14, Line 61, delete ""$F_3$"}]" and insert -- "$F_3$"}]. --, therefor.

In Column 14, Line 63, delete "performance" and insert -- performing --, therefor.

In Column 14, Line 66, delete ""$F_1$}," and insert -- "$F_1$"}, --, therefor.

In Column 14, Line 66, delete "value:"$F_3$}," and insert -- value: "$F_3$"}, --, therefor.

In Column 14, Lines 66-67, delete "{weight: 0.1, value: "$F_2$"}], [weight 0.01, value: "$F_4$")]," and insert -- {weight: 0.1, value: "$F_2$"}, {weight: 0.01, value: "$F_4$"}], --, therefor.

In Column 15, Line 31, delete "$M_1$=[$F_3$, $F_2$]" and insert -- $M_1$=[$F_1$, $F_3$, $F_2$] --, therefor.

CERTIFICATE OF CORRECTION (continued)
U.S. Pat. No. 11,580,452 B2

In Column 16, Line 45, delete "sport" and insert -- sports --, therefor.

In Column 16, Line 47, delete "with by" and insert -- with --, therefor.

In Column 17, Line 17, delete ""$F_1$},"  and insert -- "$F_1$"}, --, therefor.

In Column 17, Line 17, delete "value:"$F_2$}])." and insert -- value: "$F_2$"}]). --, therefor.

In Column 17, Line 30, delete "devices" and insert -- devices' --, therefor.

In Column 18, Line 32, delete "logical" and insert -- logic --, therefor.

In the Claims

In Column 20, Line 48, in Claim 12, delete "and" and insert the same at Line 47, after "model;" as a continuation sub-point.

In Column 20, Line 60, in Claim 13, delete "and" and insert the same at Line 59, after "model;" as a continuation sub-point.